United States Patent [19]

van der Heem

[11] Patent Number: 4,758,440
[45] Date of Patent: Jul. 19, 1988

[54] PROCESS FOR CHILLPROOFING A MALT BEVERAGE AND SILICA PRODUCT FOR CHILLPROOFING

[76] Inventor: Peter van der Heem, 3001 South Tower, 15 Charles Plz., Baltimore, Md. 21201

[21] Appl. No.: 825,588

[22] Filed: Feb. 3, 1986

[51] Int. Cl.⁴ .............................................. C12H 1/02
[52] U.S. Cl. ................... 426/330.4; 426/423; 426/590; 423/335
[58] Field of Search ............... 426/330, 422, 423, 424, 426/425, 330.3, 330.4, 590; 502/407, 502, 232; 423/335, 338; 210/502.1, 716, 691, 717

[56] References Cited

U.S. PATENT DOCUMENTS

| 2,316,241 | 4/1943 | Heimann | 426/423 |
| 3,436,225 | 4/1969 | Raible | 426/330.4 |
| 3,607,777 | 9/1971 | Winyall | 502/407 |
| 3,617,301 | 11/1971 | Barby | 426/442 |
| 4,508,742 | 4/1985 | McLaughlin et al. | 426/330.4 |
| 4,515,821 | 5/1985 | Armstead et al. | 426/330.4 |
| 4,636,394 | 1/1987 | Hsu | 426/423 |

FOREIGN PATENT DOCUMENTS 769529  11/1971  Belgium .............................. 426/423

Primary Examiner—Raymond N. Jones
Assistant Examiner—Carolyn Paden

[57] ABSTRACT

An improved process for chillproofing a malt beverage with silica, the improvement being in the nature of the silica used and the improved results obtained thereby. The silica is aged with ammonia for a prolonged period of time. Better stability with smaller amounts of silica are obtained.

9 Claims, 1 Drawing Sheet

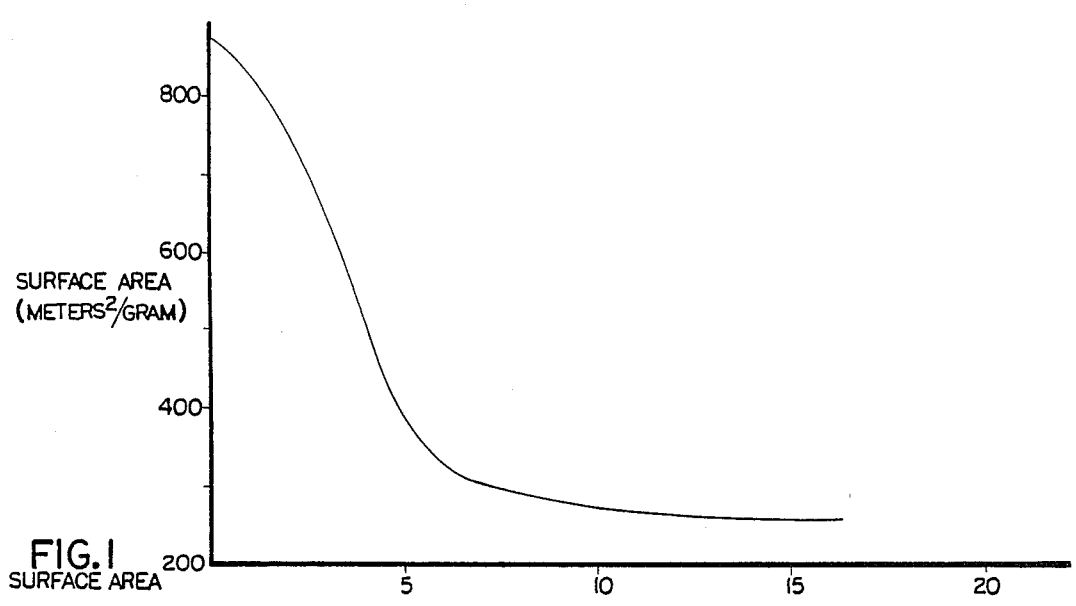
FIG.1 SURFACE AREA
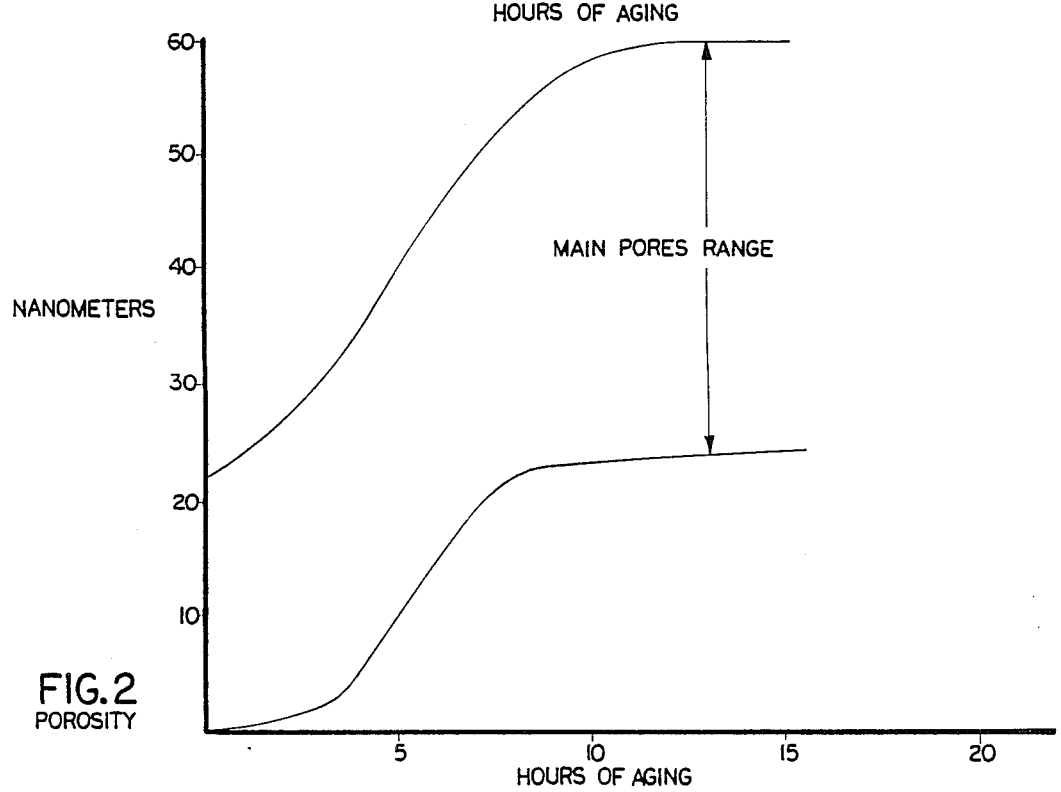
FIG.2 POROSITY
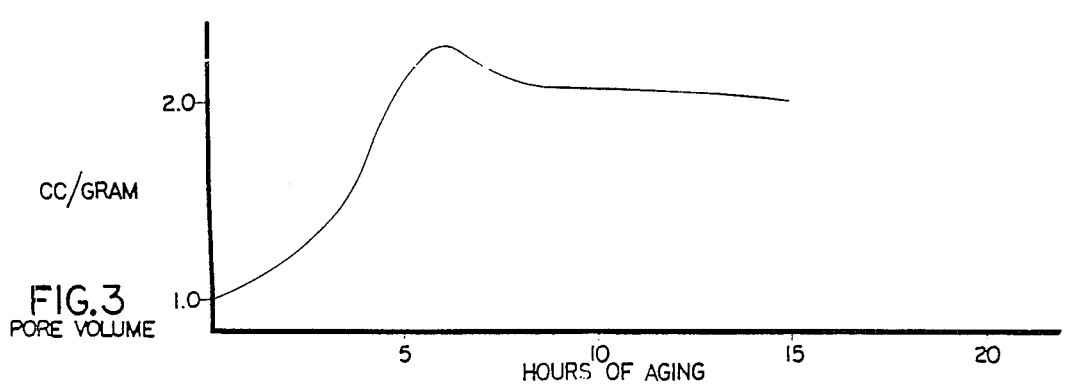
FIG.3 PORE VOLUME

PROCESS FOR CHILLPROOFING A MALT BEVERAGE AND SILICA PRODUCT FOR CHILLPROOFING

This invention relates to an improved process for chillproofing a malt beverage with silica, the improvement being in the nature of the silica used and the results obtained thereby. Ammonia aged silica is used in accordance herewith.

BACKGROUND OF THE INVENTION AND PRIOR ART

The use of silica for "chillproofing" beer is well known. Reference may be had to the U.S. Pat. to McLaughlin et al No. 4,508,742 dated 2 Apr. 1985 and to the background and prior art references cited therein. Reference may also be had to U.S. Pat. Nos. 3,716,493 dated 13 Feb. 1973 and 3,959,174 to Winyall et al dated 25 May 1976 each of which discloses a method of making an ammonia aged silica.

Basically, the problem with beers, ales, lagers, and stouts is one of the tendency of these beverages to form haze or turbidity on storage. Treating the malt beverage with various kinds of silica removes or sequesters the agents responsible for haze formation at reduced temperatures to various degrees. After treatment, the silica is removed. This process is known as "chillproofing". To my knowledge, the only worker in the art who has used an ammonia treated silica for the chillproofing of malt beverages is Heimann, U.S. Pat. No. 2,316,241 dated 13 Apr. 1943.

Heimann (U.S. Pat. No. 2,316,241 dated 13 Apr. 1943) uses a gel that contains more water than the gels used in this invention. The patentee uses concentrated hydrochloric acid (the commercial product generally has 36% HCl) diluted with an equal volume of water, yielding approximately 18% acid. He neutralizes this with 40° Baume waterglass solution (37% sodium silicate) which is also diluted with an equal volume of water, resulting in an approximately 18.5% sodium silicate solution. The ingredients for the gel preparation used in a specific embodiment of the present invention are 41.5% sulfuric acid and 29% sodium silicate. The resulting reaction mixture of the present invention has approximately half the amount of water compared with Heimann's mixture. Those skilled in the art know that this difference in concentration causes the solidification of a gel to take approximately ten times longer for the more dilute system. This is the reason Heimann makes his gel by one of three methods: 1. Precipitation with ammonia, or 2. by letting the mixture stand for several days or 3. by heating the mixture to 90 or 100 degrees C. The gel used in the present invention gelatinizes in 30 to 60 minutes. (Date for this difference of gelation time are given in "The chemistry of silica" by Ralph K. Iler, John Wiley & Sons, 1979, page 368). The differences in the character of gels is given by Heimann in his patent. On page one, left side line 53, he mentions that the stabilizing effect of his product "cannot be attained when employing an ordinary silica gel prepared with an acid". The gel of this invention is an ordinary silica gel prepared with acid.

Prior processes use, in general, higher amounts of silica up to 25 lbs/100 bbls of beverage.

BRIEF DESCRIPTION OF THE DRAWINGS

FIG. 1 is a graph showing the variation of surface area in meters$^2$ per gram vs. hours of aging.

FIG. 2 is a graph showing the variation of pore diameter in nanometers vs. hours of aging.

FIG. 3 is a graph showing the variation of the pore volume in cc/gram vs. hours of aging.

BRIEF STATEMENT OF THE INVENTION

Briefly stated, the present invention is in a process for chillproofing a malt beverage, e.g., beer, by mixing a slurry of a "wet" ammonia aged silica (which exists of free flowing powder) with the beverage for a predetermined period of time and thereafter removing the silica. The silica is aged at a pH of from 8.5 to 10 for a period in the range of from 5 to 20 hours at a temperature of from 60° to 90° C. The aged product is milled with a fluid energy mill, for example, to a particle size of from 4 to 30 microns, and a water content of 35% to 70% $H_2O$ by weight. Although the aged silica hydrogels used herein exist as free flowing powders, they contain a substantial amount of water by weight and are therefore referred to herein as "wet". The silica, when its water is substantially removed (<5% $H_2O$) with a suitable solvent, e.g., methyl alcohol, acetone, or diethyl ether, or mixtures thereof, has a surface area of from 175 to 450 meters$^2$/gram, a pore volume of from 1.5 to 2.4 cc/gram and a pore diameter of from 15 to 60 nanometers. The "wet" ammonia aged silica so formed is slurried in water to a concentration of 5% to 15% solids (on a dry basis) by weight and added to the malt beverage in an amount ranging, from about 2 to about 8 pounds dry silica per 100 barrels of malt beverage. Although more or less of the ammonia aged silicas hereof may be used depending on the particular requirements of the brewer, best results are secured with from about 2 to about 8 pounds of the silica/100 bbls. of the beverage. Contact between the silica and the beverage is maintained for a period of from 1 minute to 24 hours.

DETAILED DESCRIPTION OF THE INVENTION AND SPECIFIC EXAMPLES

As indicated above, the improved chillproofing process of the present invention contemplates adding a particular "wet", ammonia aged silica to a malt beverage, mixing for a predetermined period of time and then removing the silica. The improved silica is an ammonia aged silica gel which is aged for a much longer period of time than Acker discloses. The starting silica is a hydrogel and any of the known methods for forming such hydrogels may be used. The aging conditions to which the starting gel is exposed are:

(a) Contacting the silica, preferably a silica hydrogel with an ammonia solution in water with 8.5<pH<10.0, preferably <9pH<10.

(b) The contact time of the ammonia with the gel ranges from about 5 to about 20 hours, preferably from about 8 to about 15 hours.

(c) The temperature during contact is from 60° to 90° C., preferably 70° to 80° C.

(d) The aged product is milled to an average particle size of 4 to 30 micrometers (preferably 7 to 20 micrometers) and has a water content of 35 to 70% by weight (preferably 55% to 68%).

The aged gel has the following properties: These properties were determined after the removal of water by washing the watercontaining product with methyl or ethyl alcohol, diethylether or acetone or mixtures thereof and drying the product in vacuum. This is necessary because the properties were determined on the dry or substantially water free product, and drying without a preceeding removal of the major amount (e.g., 98%) water with a solvent or solvent mixture destroys the pore structure.

Surface area: 175 to 450- m²/g, preferably 200 to 350 m²/g.

Pore volume: 1.5 to 2.4 cc/g., preferably 1.75 to 2.25 cc/g.

Pore diameter: 15 to 60 nanometers, preferably 25 to 45 nanometers.

Reference may be had to the annexed drawings which are graphs showing the variation of various important physical properties with the hours of ammonia aging. These graphs show aging for a minimum of about 5 hours is critical to the development of the desired properties of surface area, porosity and pore volume. While the maximums of each occur at slightly different periods of aging, the useful and ideal values are obtained in the broad range of 5 to 20 hours, and preferably from 8 to 15 hours.

FIG. 1 shows how the surface area varies with time of aging. While less than 5 hours gives a larger surface area, maximum pore volume (FIG. 3) does not occur until after 5 hours. Also, maximum porosity (FIG. 2) which measures pore diameter in nanometers does not occur until after 5 hours of aging. Beyond 10-15 hours of aging the changes in the properties illustrated in the several graphs do not change materially. It is desirable to reach a balance which occurs at about 8 hours where the more important pore volume (FIG. 3) and porosity (FIG. 2) have gained near maximum value. The surface area is not as important, and although large surface area is desirable, the maximum values of the other properties are more critical of achievement, and hence some surface area is sacrificed for these values.

The aged silica product of this invention is added to beer, preferably as a 5% to 15% slurry, by weight, in water freed from dissolved air, and carefully mixed. After a contact time of between one minute and 24 hours (preferably between 3 and 120 minutes) at a temperature less than about 25° C., silica is removed from the beer by centrifugation and/or filtration and/or sedimentation. The treated beer is then processed in the regular way.

When the malt beverage is chillproofed in this way with the product of this invention it will be more clear than without this treatment and will not, during the time of normal storage, develop any haze at temperatures between 0° C. and ambient temperatures. The product and treatment will not influence foam stability, color, taste, flavor or other properties essential for its quality.

The product as it is used in this invention appears to have a chemical and/or physical structure different from other silicas prepared by acid washing. This is—together with surface area, pore size, pore volume and water content—the main reason why the product of the present invention has a higher chillproofing ability than any other silicas.

To illustrate the preparation of the ammonia aged products hereof, 36° Baume sulfuric acid is combined with 32.1° Baume sodium silicate and allowed to set to a hydrogel. The gel is sized and washed with hot water. (See U.S. Pat. No. 4,097,302 by H. J. Cohen et al dated 27 June 1978). Aging with ammonia is accomplished with an aqueous solution of ammonia at 60° to 90° C. at a concentration corresponding to an alkalinity at a pH between 9 and 10. The aging lasts several hours. The properties of the gel changed in the following way:

TABLE I

| Aging of Gel and the Change of Properties with Time |  |
|---|---|
| Aging Time |  |
| | Surface Area in M²/g |
| Start: | 875 |
| Three hours: | 660 |
| Six hours: | 325 |
| Nine hours: | 290 |
| Twelve hours: | 270 |
| Fifteen hours: | 265 |
| | Pore Volume Wet cc/g |
| Start: | 1.01 |
| Three hours: | 1.41 |
| Six hours: | 2.25 |
| Nine hours: | 2.06 |
| Twelve hours: | 2.05 |
| Fifteen hours: | 2.01 |
| | Pore Size Wet in A |
| Start: | 80 |
| Three hours: | 257 |
| Six hours: | 423 |
| Nine hours: | 423 |
| Twelve hours: | 468 |
| Fifteen hours: | 517 |

The present invention uses gel with a pore size distribution as obtained after 5 to 20 hours of aging. (See FIG. 2). It is clear that a washing of gel to neutralize the acid in the precipitated gel as described by Heinmann cannot create the same pore structure as the five to twenty hours aging described here.

A "wet" aged gel prepared as above was used for the stabilization of beer.

The correct silica dosage is predetermined in accordance with standard brewing practices. Depending on the desired stability, it was found to require from 2 to 5 lb/100 bbl of beer. The beer was a lager beer that was not previously chillproofed or pasteurized.

EXAMPLES (1) A slurry of the test silica in water (10% $SiO_2$ by weight) was prepared.

(2) The slurry was deaerated by blowing carbon dioxide bubbles through the slurry for 15 minutes.

(3) Contact of the silica slurry with air could redissolve oxygen from the ambient air. Small amounts of air influence the taste and the stability of beer so that the contact with air was kept to a minimum. The slurry was added to the beer.

(4) The silica slurry was carefully mixed with beer and the contact time was kept at one hour.

(5) The beer was filtered over a pre-coat of diatomaceous earth and pasteurized using standard industrial procedures.

The stability of treated beer has been determined by measuring haze at 0° C. after chillproofing. The beer was stored for 24 hours at 0° C. and the haze was measured. This was followed by storage at 25° C. for seven days and by cooling for 24 hours at 0° C. The haze was measured again and the beer was stored at the higher temperature for another seven days. The heating and cooling cycle was repeated until the haze was higher than 2 European Brewing Congress (EBC) units. The data were graphically interpolated to determine the number of days at which a haze of exactly 2 EBC units can be expected. The longer the time in days to achieve 2 EBC units, the higher the stability. The results also depend on the age of the unstabilized beer. Because of this, the comparative tests were always done on the same day, so that results are always given for only one pair of chillproofing agents. The same chillproofing agent shows different results on different days with a given beer.

Sample silicas being compared:

(A) A "wet" silica powder containing 67% water was prepared following the English Pat. No. 1,215,928. The material has been compared on a dry basis. When the dosage is given below as 3 lb/100 bbl., the amount of the wet product used was actually 9 lb/100 bbl., i.e., the 3 lbs. is calculated on the water free basis.

(B) A silica aged with ammonia for nine hours as described above. The material was dried and milled after aging. Particle size was approximately 8 microns.

(C) A "wet" silica powder aged with ammonia for nine hours as described above. The product was milled without drying. Water content was 62% and the particle size was 21 micron.

(D) A silica similar to C. The particle size was 16 microns.

Stabilities After Chillproofing and Pasteurization (expressed in exposure days at 25° C.)

| (A) | At 3 lb/100 bbl (dry basis) | 11 days |
| (B) | At 3 lb/100 bbl (dry basis) | 14 days |
| (A) | At 5 lb/100 bbl (dry basis) | 15 days |
| (B) | At 5 lb/100 bbl (dry basis) | 18 days |
| (C) | At 2 lb/100 bbl (dry basis) | 25 days |
| (B) | At 2 lb/100 bbl (dry basis) | 19 days |
| (C) | At 3 lb/100 bbl (dry basis) | 29 days |
| (B) | At 3 lb/100 bbl (dry basis) | 22 days |
| (D) | At 2 lb/100 bbl (dry basis) | 37 days |
| (B) | At 2 lb/100 bbl (dry basis) | 19 days |
| (D) | At 3 lb/100 bbl (dry basis) | 38 days |
| (B) | At 3 lb/100 bbl (dry basis) | 22 days |

The data show clearly that the ammonia aging creates a dry product (B) that is more active than the acid washed product prepared according to the English patent.

It also shows that the wet ammonia-aged product is more active (per lb of pure $SiO_2$) than its dry counterpart. The 16 micron product by this invention is more active than the 21 micron material.

Example D illustrates the best mode of carrying out the present invention.

The test did not show any change in flavor, taste, color, pH or any other properties of the beer when it was treated with our ammonia aged silicas.

What is claimed is:

1. A process for chillproofing a malt beverage which comprises (a) aging a silica hydrogel with aqueous ammonia at a pH of from 8.5 to 10 for from about 5 to about 20 hours and at a temperature of from about 60° C. to about 90° C., milling the aged product to produce a free flowing powder having a particle size of from 4 to 30 microns, said milled powder product having a water content of from 35% to 70%, the milled product after having its water substantially removed, having a surface area of from 200 to 350 m$^2$/gram, a pore volume of from 1.5 to 2.4 cc/gram, and a pore diameter of from 15 to 60 nanometers; (b) forming a slurry of said milled powder product in water free of dissolved air to a solids concentration of from 5% to 15% by weight, (c) adding said slurry to said malt beverage at a concentration of from about 2 to about 8 lbs. dry silica per 100 bbl of malt beverage, (d) contacting the silica with said malt beverage for a period of from 1 minute to 24 hours, and (e) removing said silica from said malt beverage.

2. A process as defined in claim 1 wherein the aging period is from about 8 hours to about 18 hours.

3. A process as defined in claim 1 wherein the temperature of aging is from 70° C. to 80° C.

4. A process as defined in claim 1 wherein the particle size of the "wet" milled product is from 7 to 20 micrometers.

5. A process as defined in claim 1 wherein the water content of the "wet" milled product is from 55% to 68% by weight.

6. A process as defined in claim 1 wherein the aging period is from about 8 hours to about 18 hours, the temperature of aging is from 70° C. to 80° C., the particle size of the "wet" milled product is from 7 to 20 micrometers, and the water content of the "wet" milled product is from 55% to 68% by weight.

7. A process as defined in claim 1 wherein the pore volume is from 1.75 to 2.25 cubic centimeters per gram.

8. A process as defined in claim 1 wherein the pore diameter is 24-45 nanometers.

9. A process as defined in claim 1 wherein the surface area is from 200 to 350 meters$^2$ per gram; the pore volume is from 1.75 to 2.25 cubic centimeters per gram, and the pore diameter is 25-45 nanometers.

* * * * *